Figure 2:
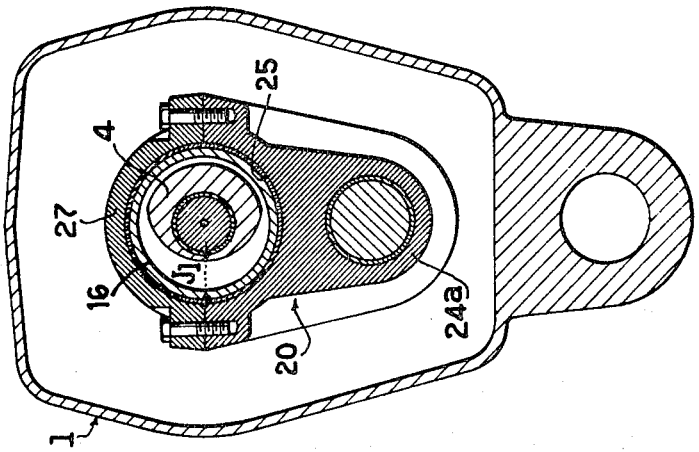

United States Patent

Falay et al.

[15] 3,670,586
[45] June 20, 1972

[54] SPEED VARIATOR WITH FRICTION ELEMENTS

[72] Inventors: Bernard Falay, Paris; Armand Froumajou, Pontoise, both of France

[73] Assignees: Automobiles Peugeot, Paris; Regie Nationale des Usines Renault, Billancourt, France

[22] Filed: Nov. 13, 1970

[21] Appl. No.: 89,399

[30] Foreign Application Priority Data

Feb. 19, 1970  France..................................7005916

[52] U.S. Cl...............................................................74/199
[51] Int. Cl..................................................F16h 15/08
[58] Field of Search...........................................74/199, 190

[56] References Cited

UNITED STATES PATENTS

| | | |
|---|---|---|
| 3,387,507 | 6/1968 | De Coye De Castelet............74/199 X |
| 3,381,777 | 5/1968 | Flichy....................................74/199 X |
| 3,453,904 | 7/1969 | Dangauthier..........................74/199 X |
| 3,557,636 | 1/1971 | Dangauthier..........................74/199 X |

*Primary Examiner*—Leonard H. Gerin
*Attorney*—Burns, Doane, Swecker & Mathis

[57] ABSTRACT

Speed variator comprising a rocker element mounted to swing about a first axis in a housing. The housing contains a first support rotatable about a second axis and carrying a first series of friction elements and a second support mounted in the rocker element to rotate about a third axis and carrying a second series of friction elements engaged between the friction elements of the first series. Means are provided to modify the angular position of the rocker element with respect to the housing and thus modify the distance between the first, second and third axis.

8 Claims, 5 Drawing Figures

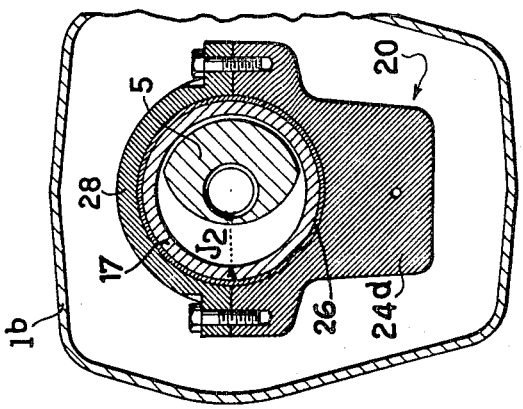
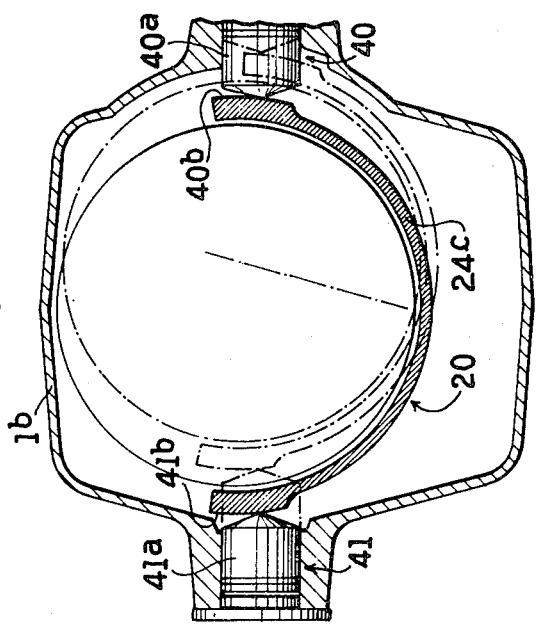
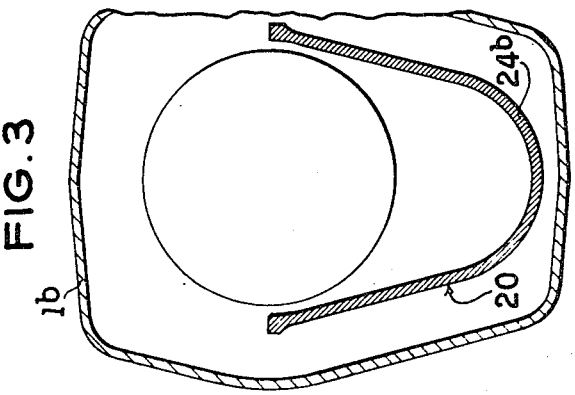

SPEED VARIATOR WITH FRICTION ELEMENTS

The present invention relates to speed variators in particular for use in the transmission systems of automobile vehicles.

Such speed variators having friction elements are known in which a first series of elements constituted by male disks connected to rotate with a driving shaft are wedged or pressed between elements of a second series constituted by female rings which are connected to rotate with a drum secured to a driven shaft. Means are provided for varying the offset between the parallel axes of the two series of elements, namely disks and rings, this variation in the offset resulting in a corresponding modification in the ratio of the angular velocities between the driven shaft and driving shaft.

Such a speed variator is described in particular in the Ser. No. 830,208, now U.S. Pat. No. 3,557,636. As can be seen in this patent, the driving shaft carries the male disks and is journalled in a rocker element which is mounted to swing about a shaft which constitutes the input shaft of the variator and drives the driving shaft through a pair of gears respectively integral with the input shaft and the driving shaft. The swinging of the rocker element about the input shaft results in the variation in the offset of the aforementioned axes of the driving and driven shafts and in the desired speed variation. In this known device, the male disks are slidably mounted on splines at one end of the driving shaft, and the female rings are slidably mounted at the adjacent end of the drum so that the part of the driving shaft supporting the disks is overhanging inside the drum supporting the rings, the drum being itself overhanging at the end of the shaft with which it is integral. Having regard to the considerable forces created at the surfaces of contact between the disks and rings, this overhanging arrangement is harmful, in particular for the driving shaft which is journalled in the rocker element.

According to another known embodiment, equivalent as concerns the results obtained, it is the shaft bearing the drum which is journalled in a rocker element swinging about the output shaft of the variator and which rotates the output shaft through a pair of gears. Of course, all the drawbacks just mentioned in respect of the device described in the Ser. No. 830,208 are present in this second embodiment.

The object of the invention is to provide a speed variator of the type comprising two series of friction elements respectively connected to a driving shaft and to a driven shaft in which the relative position of the respective axes of the two series of elements can be modified in such manner as to vary the ratio between the angular velocities of the driving shaft and driven shaft and which avoids the serious drawbacks mentioned hereinbefore residing in the overhanging arrangement of the two series of elements relative to the shaft with which they are connected to rotate.

The invention provides a speed variator of the type comprising two series of friction elements having parallel axes and means for varying the distance between said axes in such manner as to modify the ratio between the respective angular velocities of the series of elements, the variator comprising a fixed housing in which the whole of the variator is disposed and which has two opposed faces, a rocker element mounted in the housing between said faces to swing about a first fixed axis, a first support carrying a first series of elements of the variator and mounted between said faces to rotate about a second fixed axis, a second support carrying a second series of elements of the variator and mounted in the rocker element to rotate about a third axis, said means being adapted to modify the angular position of the rocker element with respect to the housing and thus modify the position of the third axis with respect to the second axis.

According to a preferred embodiment, the first support constitutes the driving shaft of the variator and carries a series of friction disks and the second support is a drum which carries a series of rings between which the disks are pressed, said driving shaft being mounted to rotate between the two opposed faces of the housing and consequently extending through the rocker element and the drum which carries teeth meshed with a gear integral with an output shaft mounted in a bearing concentric with one of the bearings mounting the rocker element on the housing.

This provides a speed variator in which there is no overhanging arrangement and which is in a particularly compact and convenient form, since the whole of the variator is located in a single housing.

Further features and advantages of the invention will be apparent from the ensuing description with reference to the accompanying drawings.

Figure 1:
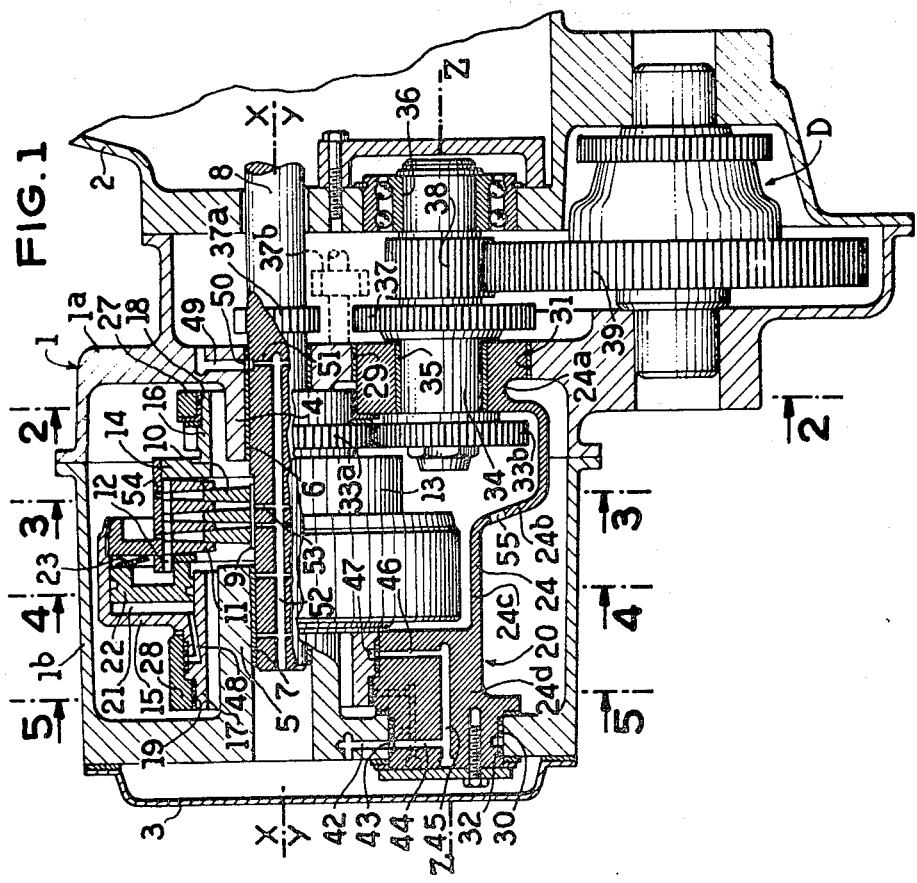

In the drawings:

FIG. 1 is a side elevational view, partly in section, of a speed variator according to the invention;

FIGS. 2, 3, 4 and 5 are cross-sectional views taken along lines 2—2, 3—3, 4—4 and 5—5 of FIG. 1.

With reference first to FIG. 1, there is shown a speed variator V according to the invention disposed in a housing 1 which is fixed to the case 2 of a hydrokinetic torque converter (not shown). The housing 1 is in two main parts 1a, 1b and is closed by an end cover 3. The semi-housings 1a, 1b carry bosses 4 and 5 respectively which extend inwardly of the housing and define two coaxial bearings 6 and 7 receiving a driving shaft 8 which has an axis X—X and is adapted to be driven by the torque converter.

The shaft 8 carries in its middle part splines 9 on which are slidably mounted male disks 10 which constitute a first series of friction elements of the speed variator.

The second series of friction elements of the variator is constituted by female rings 11 having an axis Y—Y and slidably mounted on splines 12 formed on the inner face of a drum 13. The latter is integral with two side walls 14 and 15 which are extended by two bearing portions 16 and 17 respectively journalled in bearings 18 and 19 carried by a rocker element 20.

The side walls 15 define a chamber 21 in which is located a pressure plate 22 adapted to apply the female rings 11 against the disks 10 in opposition to the action of a spring 23.

The rocker element 20, which constitutes an essential part of the device, has a lower part 24 defining a first end block 24a, a sump 24b, a middle part 24c and a second end block 24d. The upper parts of the end blocks 24a and 14d define two semi-bearings 25 and 26 which respectively carry two upper semi-bearings 27 and 28 secured by means of screws. The bearings thus formed receive the bearing portions 16 and 17 of the drum 13 which are rotatable therein.

It will be seen from the FIGS. 2 and 5 that the bearing portions 16, 17 integral with the drum 13 are in the form of sleeves which surround the bosses 4 and 5 of the two semi-housings 1a, 1b and that each of the bosses 4 and 5 has such cross-sectional shape as to define with inner faces of the portions 16 and 17 a clearance $J_1$ and $J_2$ respectively in the shape of a quarter of the moon and allows the rocker element 20 to swing, as will be clear hereinafter. The rocker element 20 is pivotally mounted with respect to the housing 1 by two bearing portions 29 and 30 which are formed in the end blocks 24a and 24d and journalled respectively in the bearings 31 and 32 in the opposed end walls of the semi-housings 1a and 1b. The pivot axis of the rocker element 20 about which it swings with respect to the housing is designated by the reference Z—Z in FIG. 1.

The bearing portion 16 integral with the drum 13 carries, between the drum and the bearing 18, a gear 33a which meshes with a gear 33b integral with an output shaft 34. The latter is journalled in a bearing 35 which is formed in the block 24a and is coaxial with the axis Z—Z. The shaft 34 is also journalled in a bearing 36 carried by the case 2 of the torque converter. The output shaft 34 carries a gear 37 which is adapted to co-operate with a gear 37a directly carried by the driving shaft 8 so as to constitute a reverse speed through a sliding gear 37b. The output shaft 34 also carries a gear 38 which is adapted to mesh with the gear ring 39 of a differential D incorporated in the transmission device.

As can be seen in FIG. 4, the rocker element 20 is swung in the known manner by means of two linear motors 40 and 41 whose pistons 40a and 41a have ends in contact with corresponding bearing faces 40b and 41b on the rocker element 20.

The chamber 21 of the drum 13 is put under pressure through a conduit 42 formed in the housing, a groove 43, conduits 44, 45, 46, a groove 47 and a conduit 48.

Lubrication between the disks 10 and rings 11 is effected by an oil supply 49 through a groove 50 and conduits 51, 52 and 53, the oil being thereafter discharged from the drum 13 by way of peripheral orifices 54. An amount of oil is maintained in the sump formed by the part 24b of the rocker element 20 up to the level of an orifice 55 so as to lubricate the pair of gears 33a and 33b.

The speed variator just described operates in the following manner:

The input shaft 8 is driven in rotation by the torque converter (not shown) and drives the disks 10 which are pressed between the rings 11.

The rotational speed of the rings 11 and of the drum 13 connected to rotate with the rings is a function of the offset between the axis X—X of the input shaft and the axis Y—Y of the drum, this offset being adjusted by modifying the position of the rocker element 20 about its axis Z—Z by means of the linear motors 40 and 41 shown in FIG. 4. The output is by way of the gears 33a, 33b and the shaft 34, the gear 33 being meshed with the gear ring 49 of the differential D.

It will be observed that, as opposed to conventional devices, no part of the variator according to the invention is arranged in an overhanging manner. The input shaft 8 is supported in two bearings 6 and 7 provided in the opposed faces of the housing, the bosses in which the bearings are formed can extend up to the immediate vicinity of the disks 10, which avoids any bending stress in the shaft 8. It will be understood that this arrangement is particularly favorable to a reliable operation and long life of the device.

The drum 13 is also carried through its side walls 14 and 15 in two bearings formed in the rocker element 20 and the latter is mounted to swing with respect to the housing about two bearings 31 and 32.

It will be also observed that the assembly is particularly compact and well balanced, which is very advantageous in the application to motor-driven units for automobile vehicles.

We claim:

1. A speed variator comprising a housing having two opposed walls in spaced relation, said walls having two bosses extending inwardly from the walls toward each other, a first support mounted in the two bosses to rotate about a first axis, a first series of friction elements carried by the first support, a rocker element mounted to pivot within the housing about a second axis parallel to the first axis, means defining a second support having two end bearing portions, a second series of friction elements carried by the second support and co-operative with the first series of friction elements, means defining two bearings in coaxial relation on the rocker element and respectively encompassing the two bosses, the two end bearing portions being respectively journalled in the two bearings so that the second support is rotatable about a third axis parallel to the first axis and second axis, the two bearing portions being tubular and respectively encompassing the two bosses with clearance radially of the first axis to allow pivotal movement of the rocker element about the second axis, means for pressing the first series and second series of friction elements into drive-transmitting engagement and means for adjusting the position of the rocker element about the second axis and consequently the position of the third axis relative to the first axis.

2. A speed variator as claimed in claim 1, comprising two bearings in the two opposed walls on the second axis, means defining two bearing portions on the rocker element and respectively journalled in the bearings in the two walls, the first support constituting a driving shaft of the variator and carrying a series of friction disks constituting said first friction elements and the second support being a drum which carries a series of rings constituting said second friction elements between which the disks are adapted to be pressed by the pressing means, the drum carrying means defining gear teeth, means defining a second bearing which is coaxial with the bearings in the two walls, an output shaft rotatably mounted in the second bearing, and a gear integral with the output shaft and meshed with the drum teeth.

3. A speed variator as claimed in claim 2, wherein the rocker element comprises a lower part defining two lower semi-bearings which correspond to a lower half of said bearings in the rocker element, and defining said two bearing portions of the rocker element, an intermediate part interconnecting said bearing portions of the rocker element, and two upper semi-bearings respectively secured to said lower semi-bearings and forming an upper half of said bearings in the rocker element, and said intermediate part constitutes an oil sump for said gear.

4. A speed variator as claimed in claim 3, wherein the intermediate part defines two abutment faces, said means for adjusting the position of the rocker element comprising two piston-and-cylinder control devices in fixed relation to the housing and including pistons engaging the two abutment faces.

5. A speed variator as claimed in claim 1, comprising second bearings in the opposed two walls of the housing, and two end bearing portions on the rocker element by which the rocker element is journalled in the second bearings to pivot about the second axis, an output shaft journalled in one of the end bearing portions of the rocker element in coaxial relation to said second axis, and means operatively connecting the second support to the output shaft so that rotation of the second support causes rotation of the output shaft.

6. A speed variator as claimed in claim 1, wherein the two tubular bearing portions have inner faces and the bosses have such cross-sectional shape as to define a clearance in the shape of a quarter of the moon between the bosses and the inner faces of the tubular bearing portions which allows said adjustment of the rocker element.

7. A speed variator as claimed in claim 1, wherein the drum has a center part carrying the second series of elements and two side walls defining said bearing portions on the second support.

8. A speed variator as claimed in claim 1, wherein the second support defines a drum which is interposed between said end bearing portions and contains the second friction elements and said means for pressing the friction elements together.

* * * * *